(12) United States Patent
D'Souza et al.

(10) Patent No.: US 11,953,925 B2
(45) Date of Patent: Apr. 9, 2024

(54) LOAD-CURRENT SENSING FOR FREQUENCY COMPENSATION IN A LINEAR VOLTAGE REGULATOR

(71) Applicant: Ningbo Aura Semiconductor Co., Limited, Ningbo (CN)

(72) Inventors: Arnold J D'Souza, Bangalore (IN); Shyam Somayajula, Bangalore (IN)

(73) Assignee: Ningbo Aura Semiconductor Co., Limited, Zhejiang (CN)

( * ) Notice: Subject to any disclaimer, the term of this patent is extended or adjusted under 35 U.S.C. 154(b) by 126 days.

(21) Appl. No.: 17/457,266

(22) Filed: Dec. 2, 2021

(65) Prior Publication Data

US 2022/0350356 A1    Nov. 3, 2022

(30) Foreign Application Priority Data

May 3, 2021 (IN) .............................. 202141020193

(51) Int. Cl.
     *G05F 1/575*      (2006.01)
     *H02M 3/156*      (2006.01)

(52) U.S. Cl.
     CPC ............ *G05F 1/575* (2013.01); *H02M 3/156* (2013.01)

(58) Field of Classification Search
     CPC ..... G05F 1/00; G05F 1/10; G05F 1/12; G05F 1/46; G05F 1/455; G05F 1/45;
(Continued)

(56) References Cited

U.S. PATENT DOCUMENTS 6,603,292 B1    8/2003    Schouten et al.
6,765,374 B1    7/2004    Yang et al.
(Continued)

FOREIGN PATENT DOCUMENTS

CN     2008165686 A    7/2008
CN     101667046 A    3/2010
(Continued)

OTHER PUBLICATIONS

Raveesh Magod Ramakrishna, Ultra-low Quiescent Current NMOS Low Dropout Regulator With Fast Transient response for Always-On Internet-of-Things Applications, Aug. 2018, 76 Pages.
(Continued)

*Primary Examiner* — Jeffrey A Gblende
(74) *Attorney, Agent, or Firm* — IPHORIZONS PLLC; Narendra Reddy Thappeta

(57) ABSTRACT

A linear voltage regulator includes a first driver stage coupled between the error amplifier and the pass transistor of the regulator. A first transistor of the first driver stage has a gate terminal connected to receive the error signal from the error amplifier. A gate terminal of the pass transistor is coupled to receive an output of the first driver stage. The linear voltage regulator includes a compensation circuit for frequency compensation, and a compensation adjustment circuit. The compensation adjustment circuit in the regulator senses a magnitude of the current through the first transistor of the first driver stage, and adjusts a parameter of the compensation circuit based on the magnitude of the sensed current. Sensing the current at the first driver stage provides an indication of the load current drawn from the regulator, and is used for controlling the location of a compensating zero introduced by the compensation circuit.

19 Claims, 4 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069
See application file for complete search history.

(56) References Cited

U.S. PATENT DOCUMENTS

| | | | | |
|---|---|---|---|---|
| 7,091,710 B2* | 8/2006 | Yang | ................. | G05F 1/575 |
| | | | | 323/282 |
| 8,169,203 B1 | 5/2012 | Vemula | | |
| 8,970,188 B2* | 3/2015 | Ganta | ................. | G05F 1/575 |
| | | | | 323/273 |
| 9,256,233 B2* | 2/2016 | Mandal | ................. | G05F 1/445 |
| 9,625,925 B2* | 4/2017 | Yan | ................. | G05F 1/575 |
| 10,254,778 B1 | 4/2019 | Sambucco et al. | | |
| 2003/0218450 A1 | 11/2003 | Bonte | | |
| 2007/0159146 A1* | 7/2007 | Mandal | ................. | G05F 1/575 |
| | | | | 323/280 |
| 2012/0038332 A1* | 2/2012 | Lin | ................. | G05F 1/575 |
| | | | | 323/277 |
| 2014/0300332 A1 | 10/2014 | Ganta | | |
| 2019/0258282 A1 | 8/2019 | Magod Ramakrishna et al. | | |

FOREIGN PATENT DOCUMENTS

| | | |
|---|---|---|
| CN | 102566633 A | 7/2012 |
| CN | 102375465 B | 11/2013 |
| CN | M487465 U | 10/2014 |
| CN | 106940579 A | 7/2017 |
| CN | 202110462 U | 6/2019 |
| CN | 209014996 U | 6/2019 |
| CN | 110716602 A | 1/2020 |

OTHER PUBLICATIONS

Ka Chun Kwok and Philip K.T.Mok, Pole-Zero Trackwg Frequency Compensation for Low Dropout Regulator, 2002 IEEE International Symposium on Circuits and Systems (ISCAS), Date of Conference: May 26-29, 2002, pp. 735-738, IEEE.

Pui Ying or and Ka Nang Leung, A Fast-Transient Low-Dropout Regulator With Load-Tracking Impedance Adjustment and Loop-Gain Boosting Technique, Aug. 30, 2010,pp. 757-761, vol. 57, No. 10, IEEE.

Annajirao Garimella, Punith R. Surkanti and Paul M. Furth, Pole-Zero Analysis of Low-Dropout (LDO) Regulators, Date of Conference: Jan. 7-11, 2012, pp. 131-136. Hyderabad, India.

Nicola Adorni, Stefano Stanzione, and Andrea Boni, A 10-mA LDO With 16-nA IQ and Operating From 800-mV Supply, Date of Publication: Nov. 7, 2019, pp. 1-10.

Tsz-Fai Kwok and Wing-Hung Ki, A Stable Compensation Scheme for Low Dropout Regulator in the absence of ESR, Date of Conference:Sep. 11-13, 2007, pp. 416-419, IEEE.

First office action (in Chinese and English Translation) dated Aug. 1, 2023 for Chinese Application No. 202210074634.6, 16 pages.

* cited by examiner

LOAD-CURRENT SENSING FOR FREQUENCY COMPENSATION IN A LINEAR VOLTAGE REGULATOR

PRIORITY CLAIM

The instant patent application is related to and claims priority from the provisional India patent application entitled, "Method for Fast Indirect Load Current Sensing in an LDO", Serial No.: 202141020193, Filed: 3 May 2021, which is incorporated in its entirety herewith to the extent not inconsistent with the description herein.

BACKGROUND

Technical Field

Embodiments of the present disclosure relate generally to power supply circuits, and more specifically to load-current sensing for frequency compensation in a linear voltage regulator.

Related Art

Voltage regulator refers to a component or device which generates a stable (regulated) output voltage at an output terminal from an input voltage received at an input terminal, as is well known in the relevant arts. In general, the output voltage is sought to be maintained at a fixed level irrespective of the magnitude of load current that may be drawn by a load powered by the output voltage, or changes in the magnitude of the input voltage.

A linear voltage regulator uses a pass element operated in a linear region, positioned between the input terminal and the output terminal, and adjusts the resistance of the pass element to maintain the output voltage at the desired constant level. A negative feedback loop is normally employed for adjusting the resistance of the pass element to maintain the output voltage at the constant level.

Frequency compensation is a technique commonly employed in linear voltage regulators. The technique generally operates to ensure stability (e.g., to prevent ringing) in the output voltage and also for preventing positive feedback that could otherwise occur in the negative feedback loop normally operative in the linear voltage regulator.

There is a general need to sense the load current for frequency compensation at least when an output capacitor is used at the output terminal. Aspects of the present disclosure are directed to load-current sensing for frequency compensation in a linear voltage regulator.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A linear voltage regulator implemented according to aspects of the present disclosure includes a first driver stage coupled between the error amplifier and the pass transistor of the regulator. A first transistor of the first driver stage has a gate terminal connected to receive the error signal from the error amplifier. A gate terminal of the pass transistor is coupled to receive an output of the first driver stage. The linear voltage regulator includes a compensation circuit for frequency compensation, and a compensation adjustment circuit. The compensation adjustment circuit in the regulator senses a magnitude of the current through the first transistor of the first driver stage, and adjusts a parameter of the compensation circuit based on the magnitude of the sensed current.

Sensing the current at the first driver stage provides an indication of the load current drawn from the regulator, and is used for controlling the location of a compensating zero introduced by the compensation circuit. The compensating zero tracks the frequency location of the load-pole generated by the combination of the capacitance at the output node of the regulator and the current drawn from the output node.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Device

Figure 1:
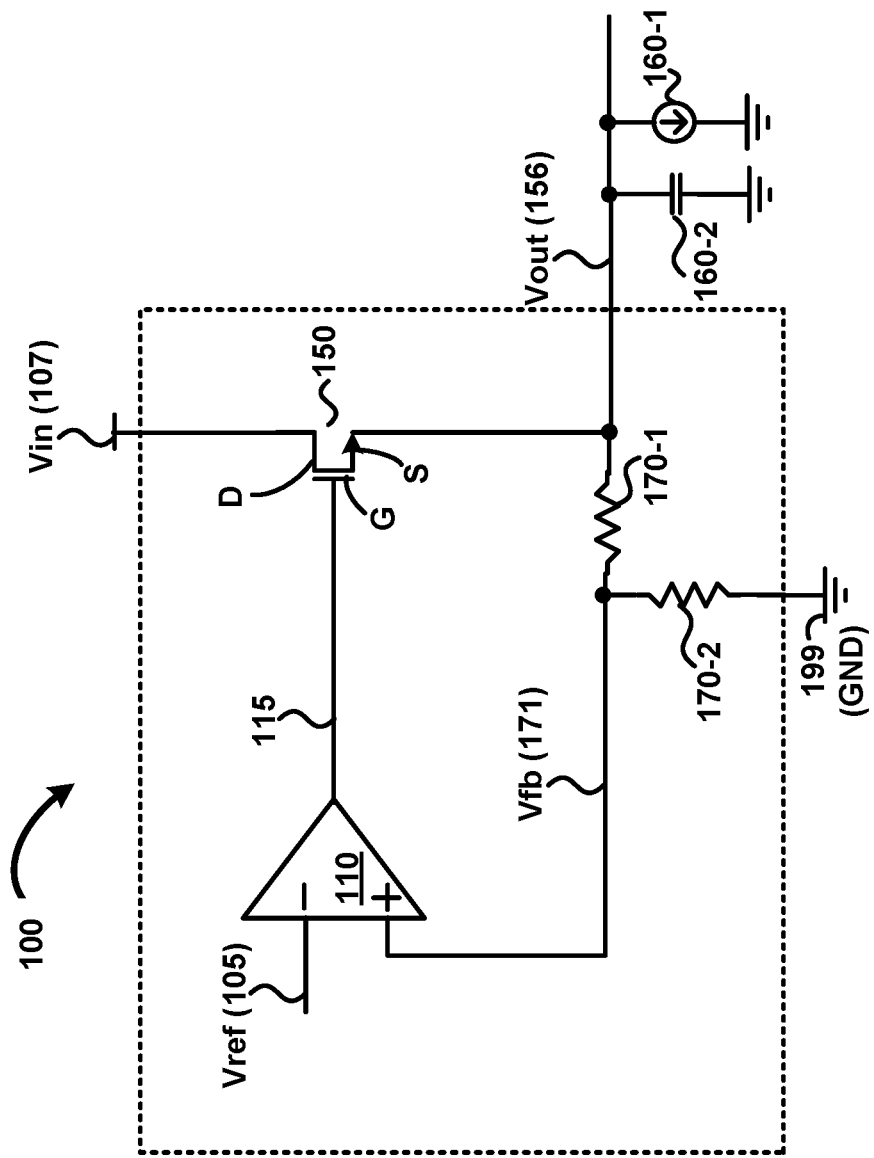
FIG. 1 is a block diagram of the general topology of a linear voltage regulator.

FIG. 1 is a diagram depicting the general topology of a linear voltage regulator. Linear voltage regulator 100 is shown containing error amplifier 110, pass transistor (pass element) 150 and voltage divider network containing resistors 170-1 and 170-2. Additionally, load capacitor 160-2 and load (current) 160-1 are also shown. Pass transistor 150 is an N-type MOSFET (metal oxide semiconductor field effect transistor or NMOS), although P-type transistors are also generally employed. NMOS 150 receives an input voltage 107 on the drain (D) terminal from a power supply source (not shown). The source (S) terminal of NMOS 150 is the output terminal of the regulator on which regulated output voltage Vout (156) is provided. The ON resistance of NMOS 150 is controlled by the voltage on the gate (G) terminal applied by error amplifier 110 via path 115, and is adjustable such that Vout (156) is maintained at the desired level despite changes in load current 160-1 and/or changes in Vin.

The voltage divider network formed by resistors 170-1 and 170-2 samples output voltage Vout, and provides a fraction of Vout to the positive terminal (+) of error amplifier 110 as a feedback voltage Vfb (171).

Error amplifier receives a reference voltage Vref (105) (which may be generated internally within regulator 100 in a known way) on the negative terminal (−). Error amplifier generates on path 115 an amplified version of the difference between Vref and Vfb to adjust the gate voltage of NMOS 150. Variations in load current 160-1 cause changes in the magnitude of Vout, which are quickly corrected by the feedback loop formed by the voltage divider and error amplifier, as is well known in the relevant arts.

Frequency compensation is normally employed in feedback systems, as is well known in the relevant arts. As with other feedback systems, in a linear voltage regulator such as regulator 100, frequency compensation is employed to prevent unintentional occurrence of positive feedback which in turn may cause the output voltage Vout to oscillate or change in any way from the constant level it should be maintained at. In addition to preventing positive feedback, frequency compensation may also be employed with the objective of minimizing or preventing overshoot and ringing in Vout in response to disturbances such as step changes in load current and/or Vin.

Frequency compensation may be effected by modifying the gain and/or phase characteristics of the regulator's open-loop transfer function. Briefly, sufficient gain and/or phase margins are ensured in the open-loop transfer function of the voltage regulator so as to prevent positive feedback from occurring, and minimize ringing in Vout in response to step disturbances. Open-loop transfer function refers to the ratio of the feedback signal and the error signal, i.e., it is the product of the transfer functions of circuits forming the path from the output of the error amplifier (115 in FIG. 1) to the input of the error amplifier that receives the feedback signal Vfb (171 in FIG. 1).

With respect to a voltage regulator such as linear voltage regulator 100, the transfer function may have two low-frequency poles, and one or more high-frequency (non-dominant) poles. The low-frequency poles may be present, for example, due to reactive (capacitive) elements at nodes 115 and Vout. In particular, capacitance of load capacitor 160-2 (in combination with transconductance of pass transistor 250) may introduce a low-frequency pole (load-pole). Further, the location (in terms of frequency) of the pole due to load capacitance shifts with the magnitude of load current 160-1. When Iload (load current 160-1) is zero, the pole (load-pole) is at a low-frequency. But as Iload increases, the load-pole moves to higher frequencies. Therefore, a compensating zero (typically introduced using a resistor and capacitor connected in series to cancel the pole(s) or minimize the effects of the pole(s)) also needs to track the load-pole as it changes in frequency, i.e., the location of the compensating zero also needs to move in frequency in the same direction (higher or lower) as the load-pole moves (higher or lower). Typically, the load current Iload is sensed and its magnitude is used to shift the compensating zero. The compensating zero is introduced such that its location in frequency tracks the load-pole frequency.

A prior technique senses the load current by mirroring the current through the pass transistor using a current mirror connected to the pass transistor 150. However, such an approach has some drawbacks. For example, it may be difficult to obtain an accurate (e.g., to the order of a few milli-Amperes) measure of Iload using such a prior approach. Further, such sensing may inherently be associated with a delay in sensing, since any load current (Iload) change needs to be reflected at the pass-transistor's current. Some causes for such delay are the inherent delays in one or more nodes of error amplifier 110, gate capacitance of pass transistor 150, etc. Such delays may translate to at least temporary instabilities in the feedback loop and result in unacceptable levels of variations or oscillations in the magnitude of Vout at least temporarily.

Aspects of the present disclosure are directed to load-current sensing for frequency compensation in a linear voltage regulator and overcome at least the drawbacks noted above.

3. Indirect Load Current Sensing

Figure 2:
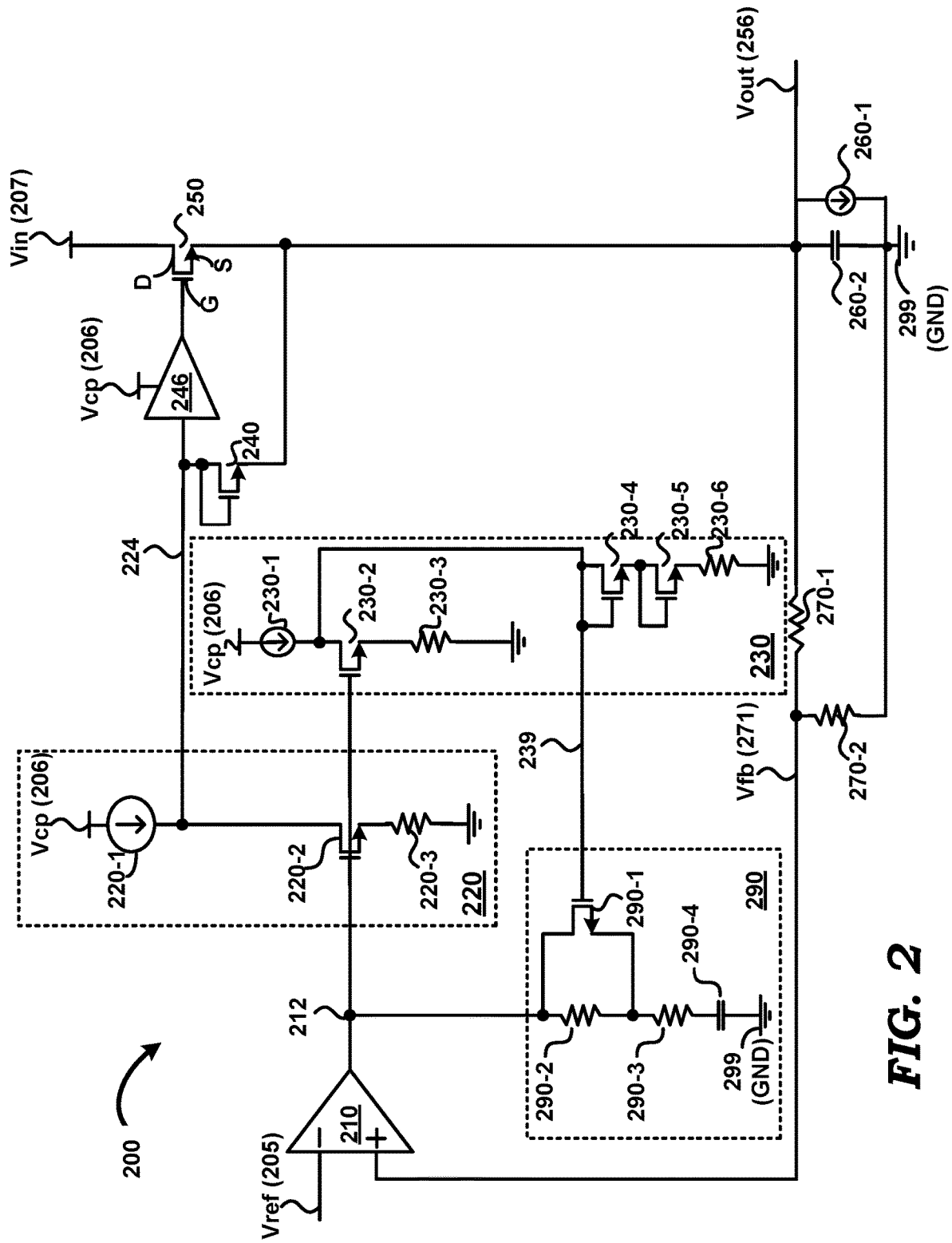
FIG. 2 is a block diagram of a linear voltage regulator, in an embodiment of the present disclosure.

FIG. 2 is a diagram of a linear voltage regulator implemented according to aspects of the present disclosure, in an embodiment. Linear voltage regulator 200, which may be implemented as a low-dropout (LDO) regulator, is shown containing error amplifier 210, driver stage 220, clamp 240, buffer 246, pass transistor 250, voltage divider formed by resistors 270-1 and 270-2, compensation adjustment circuit 230 and compensation circuit 290. Terminal 299 represents a ground (GND) terminal. Capacitor 260-2 is a load capacitor, and 260-1 represents the load current drawn from Vout 256. It is noted here that the specific details of FIG. 2 are merely provided by way of illustration, and a linear voltage regulator provided according to aspects of the present disclosure may contain more or fewer elements/blocks, as would be apparent to one skilled in the relevant arts based on the disclosure herein.

The basic operation of regulator 200 is similar to that described above with respect to FIG. 1, with error amplifier 210, pass transistor 250, load 260-2/260-1, divider formed by resistors 270-1 and 270-2 respectively operating similar to error amplifier 110, pass transistor 150, load 160-2/160-1, divider formed by resistors 170-1 and 170-2 of FIG. 1, and generating regulated output voltage Vout on output node 256 from Vin (207). Error amplifier 210 receives a reference voltage Vref (205), which may be generated internally in a known way. Transistor 250 is an NMOS transistor, and the drain, gate and source terminals are marked respectively by the letters D, G and S in FIG. 2. Vin (207) represents the input voltage from a supply source (not shown).

The combination of capacitor 260-2 and load current 360-1 together represents the load connected to Vout 256, and the combination creates a pole (load-pole) (due to capacitor 260-2 and transconductance of pass transistor 250) in the open-loop transfer function of regulator 200, and the load-pole changes in location (frequency) depending on the value of Iload (260-1) since the transconductance of pass transistor 250 correspondingly changes with Iload.

Compensation circuit 290 is designed to introduce a zero in the open-loop transfer function of regulator 200 to compensate for the dominant (low-frequency) poles of regulator 200 that include the load-pole. Open-loop transfer function of regulator 200 has the same meaning as noted above with respect to open-loop transfer function in FIG. 1. Compensation circuit 290 is shown containing resistors 290-2 and 290-3, NMOS transistor 290-1 and capacitor 290-4. Compensation circuit 290 is basically a series-connected combination of a resistance (R) and a capacitance (C), i.e., an RC network. The resistance is provided by the combination of components 290-1, 290-2 and 290-3, and the effective resistance of the combination is adjustable by applying an appropriate voltage on the gate terminal of transistor (NMOS) 290-1. By adjusting the resistance, the location (frequency) of the zero can be changed. Compensation circuit 290 is coupled across node 212 and ground.

According to an aspect of the present disclosure, linear voltage regulator 200 includes driver-stage 220, which in turn is shown containing current source 220-1, transistor (NMOS) 220-2 and resistor 220-3, connected in series between supply voltage Vcp (206) and ground. Vcp 206 may be generated by a charge pump internal to linear voltage regulator 200, but is not shown. It may be observed that driver-stage 220 is positioned between the output 212 of error amplifier 220 and gate terminal of pass transistor 250. The gate terminal of NMOS 220-2 is connected to node 212. Driver-stage 220 operates as a second gain stage (the first being error amplifier 210) and is an inverting stage that adds to the overall gain of the forward path in regulator 200. Current through transistor 220-2 and resistor 220-3 equals the difference of the (constant) current generated by current source 220-1 and the current on path 224. The current on path 224 is an output of first driver stage 220 and drives the gate terminal of pass transistor 250 (directly, or via buffer 246 when buffer 246 is implemented). It is noted herein that driver stage 220 makes it easy to perform (indirect) load-current sensing as described herein.

Compensation adjustment circuit 230 is shown containing current source 230-1, NMOS 230-2, resistor 230-3, NMOS 230-4 and 230-5 and resistor 230-6. The gate terminal of NMOS 230-2 is also coupled to node 212, the output of error amplifier 200. Resistors 220-3 degenerates transconductance Gm of transistor 220-2 for more linear control of gain and 230-3 is needed to match 220-3.

Transistors 220-2 and 230-2 form a current-mirror pair. The size of NMOS 230-2 may be implemented such that current through NMOS 230-2 is some desired fraction of the current through NMOS 220-2. The difference of the current generated by current source 230-1 and the current through NMOS 230-2 flows through the series connection of NMOS 230-4, 230-5 and resistor 230-6 to ground. The series connection of NMOS 230-4, 230-5 and resistor 230-6 is for adjusting DC bias to operate NMOS 290-1 in the correct region of operation. It is noted here that although NMOS 230-4 and 230-5 could be replaced by resistors, using NMOS transistors will track better across process variation. The voltage across node 239 (connected to gate of NMOS 290-1) and ground determines the ON resistance of NMOS 290-1. As load current increases voltage on node 239 increases, thus reducing the ON resistance of NMOS 290-1 and moving the zero to a higher frequency.

In an embodiment, the value of current 220-1 is 50 micro-Amperes (uA), current 230-1 is 10 uA, and the values of resistances 220-3 and 230-3 are 2k (kilo-ohm) and 10k respectively.

The clamp transistor 240 mirrors the output stage current since it has the same Vgs as the pass transistor 250. The current through transistor 220-2 is therefore current 220-1 minus the load current (scaled). In operation, a change in Iload (260-1) is reflected as a change in the voltage at node 212. Since voltage 212 is applied to the gate terminal of transistor 220-2, a corresponding change in current flowing through 220-2 occurs. Correspondingly, the current through NMOS 230-2 changes, and the voltage on node 239 changes correspondingly, since the current through components 230-4, 23-5 and 230-6 equals the difference of current 230-1 and current flowing through NMOS 230-2. Thus, the voltage change on node 239 causes a current change in NMOS 220-2, which is indicative of a change in Iload, and alters the ON resistance of NMOS 290-1, and thereby the effective resistance of the compensation zero circuit 290, thereby changing the location of the zero in a manner that depends on the change in Iload. For example, if Iload were to increase, Vfb would reduce. Error amplifier 210 would therefore reduce the voltage on node 212. This in turn reduces the current through NMOS 220-2 and also NMOS 230-2. As a result, the voltage at node 239 would increase, thereby reducing the ON resistance of NMOS 290-1. As a result, the effective resistance of the RC zero circuit 290 would decrease, thereby moving the zero location higher in frequency. In the case in which Iload decreases, the opposite would happen and compensation adjustment circuit would increase the ON resistance of NMOS 290-1, the effective resistance of circuit 290 would increase, and the zero would move to lower frequency. Thus, the compensation zero created by compensation circuit tracks the movements of the load-pole and compensates for it as it moves in frequency.

Voltage 212 responds more quickly to changes in load current (Iload) 260-1 than the current through pass transistor 250 (due to large gate-source capacitance of NMOS 250). Further, it may be observed from FIG. 2 that the output (212) of error amplifier 210 is isolated from gate-source capacitance of NMOS 250 due to the presence of driver stage 220 as well as clamp 240 and buffer 246, described below. It can thus be appreciated that the current through NMOS 220-2, and therefore through NMOS 230-2, also respond much more quickly to changes in load current (Iload) 260-1 than the current through pass transistor 250. Since the 'sensing' of load current is performed by mirroring the current of transistor 220-2, it may be appreciated that any delay that would otherwise occur if the current through pass transistor 250 were directly sensed (e.g., by mirroring the current through pass transistor 250) is avoided. Thus, stage 220 can be used for sensing the load current for the purpose of compensation. Therefore, fast and accurate load current sensing, and consequently, compensation zero movement is achieved in response to change in Iload and movement of the load-pole.

The use of clamp 240 and buffer 246 may further enhance the accuracy of Iload-sensing by compensation adjustment circuit 230, and also provide other benefits to linear voltage regulator 200, as described next.

Buffer 246 is implemented as a unity voltage-gain buffer (which means voltage applied to gate of NMOS 250 has a same magnitude as the voltage on path 224), and can provide a high-current output to gate terminal of NMOS 250 to quickly charge or discharge the parasitic gate-to-source or parasitic gate-to-ground capacitance of NMOS 250, both of which may be relatively large, and thereby allowing the current through pass transistor 250 to respond more quickly to changes in Iload. However, even with buffer 246 being present and operative, the response to change in Iload in the current through pass transistor 250 may still be slow, although faster than if buffer 246 were not implemented. Buffer 246 operates to isolate the output of error amplifier and node 224 from the large parasitic gate capacitance noted above. Buffer 246 is powered by voltage Vcp (206), and operates as a second buffer stage.

Clamp 240 is formed of NMOS 240 with its gate and drain terminals connected to node 224 and operates as a diode-connected transistor between nodes 224 and 256 (Vout). Since the gate terminals of NMOS 240 and pass transistor 250 are at the same potential, and since the source terminals of NMOS 240 and pass transistor 250 are also at the same potential (since they are connected), NMOS 240 mirrors the current through pass transistor 250. However, since clamp 240 is isolated from the gate-source capacitance of NMOS 250, the current through clamp 240 responds quicker to changes in load current (Iload) 260-1 than pass transistor 250.

Since the current through NMOS 220-2 is the difference between current 220-1 and the current flowing on path 224, through clamp 240 and into output node 256, the current through NMOS 220-2 may be rendered a more accurate indication of change in Iload. In general, the current through NMOS 220-2 or 230-2 is a quickly-obtained and good-enough representation of the (current value of) load current, and which is usable by compensation circuit 290. Beyond a certain load current the load-pole is sufficiently pushed out (in frequency) that any more tracking of the zero location is not required. So the current sensing range can be limited to save quiescent power.

It is noted here that linear voltage regulator 200 may be implemented without clamp 240 and buffer 246 in some embodiments of the present disclosure. In such embodiments, node 224 is directly connected to gate terminal of pass transistor 250.

Figure 3:
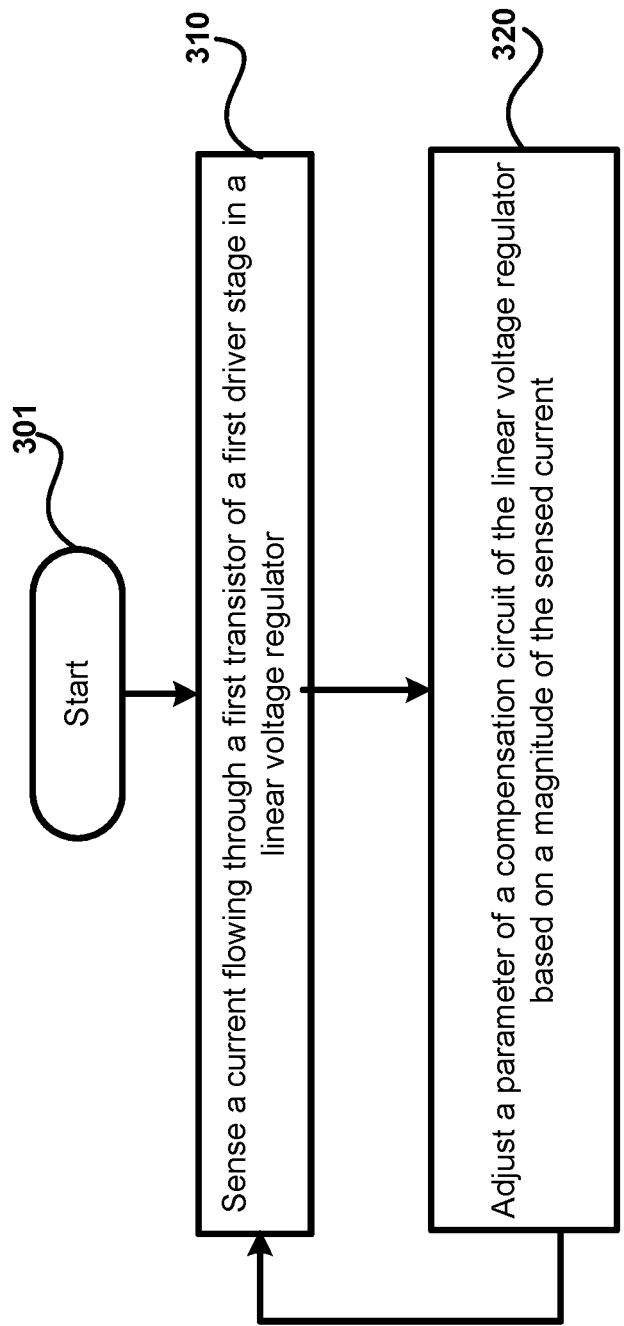
FIG. 3 is a flowchart illustrating the manner in which frequency compensation is provided in an embodiment of the present disclosure.

The operations described above in effecting a tracking compensation zero can be summarized as in the flowchart of FIG. 3, noted briefly next.

The flowchart of FIG. 3 starts in step 301, in which control passes immediately to step 310.

In step 310, a compensation adjustment circuit senses a current flowing through a first transistor of a first driver stage in regulator 200. The current thus sensed is indicative of the load current Iload. The first driver stage is connected between the output of an error amplifier and the pass transistor of the linear voltage regulator. Control then passes to step 320.

In step 320, the compensation adjustment circuit adjusts a parameter of a compensation circuit of the linear voltage regulator based on a magnitude of the sensed current. Control then pass back to step 310, and the steps may be repeated.

Linear voltage regulator 200 implemented as described above can be incorporated in a larger device or system as described briefly next with an example.

4. System

Figure 4:
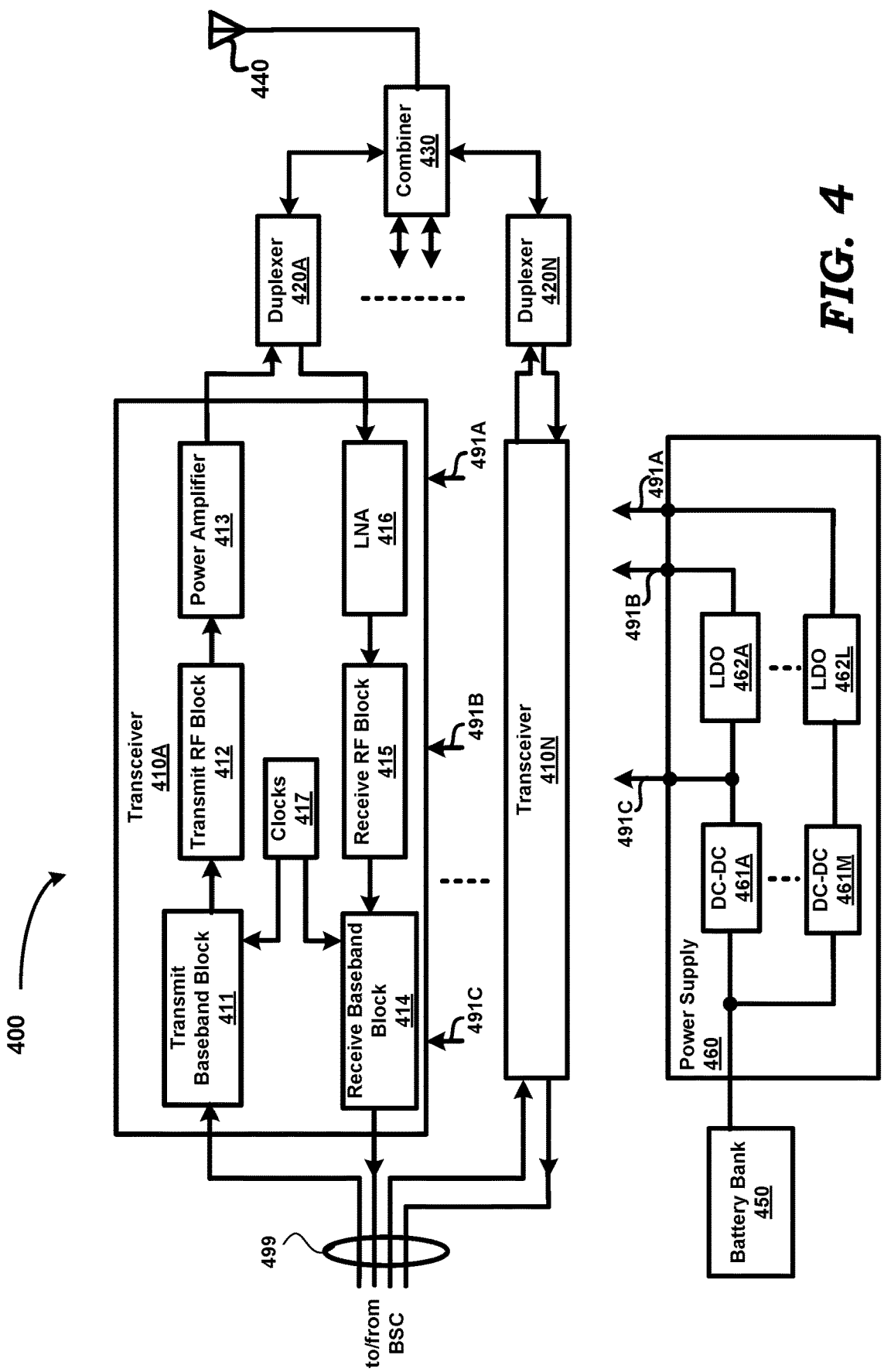
FIG. 4 is a block diagram of an example system in which a linear voltage regulator implemented according to several aspects of the present disclosure can be incorporated.

FIG. 4 is a block diagram illustrating the implementation details of a system incorporating linear voltage regulator 200 described in detail above, in an embodiment of the present disclosure. The system of FIG. 4 may be deployed in a Base Transceiver Station (BTS) (eNodeB in LTE-Long Term Evolution) of a cellular telephony system, and is referred to herein as BTS system 400. Broadly, BTS system 400 facilitates wireless communication between user equipment (UE) that may be mobile stations (e.g., cell phones) or fixed user equipment such as computers with internet connectivity. BTS system 400 may be implemented consistent with technologies and standards such as GSM, CDMA, 3G, 4G, LTE, 5G, etc. BTS system 400 is shown containing transceivers 410A through 410N, duplexers 420A through 420N, combiner 430, antenna 440, battery pack 450 and power supply 460. The specific components/blocks of BTS system 400 are shown merely by way of illustration. However, typically BTS system 400 may contain more components/blocks, such as temperature sensors, maintenance and configuration blocks, etc., as is well-known in the relevant arts.

Each of transceivers 410A through 410N operates to transmit and receive communication signals to/from wireless user equipment via the corresponding duplexer 420A-420N, combiner 430 and antenna 440. Each of the transceivers contains a transmitter portion and a receiver portion. Thus, transceiver 410A is shown containing a transmitter portion that includes transmit baseband block 411, transmit RF block 412 and power amplifier 413, and a receiver portion that includes low-noise amplifier (LNA) 416, receive RF block 415 and receive baseband block 414.

Transmit baseband block 411 receives information signals (e.g., representing voice, data) from a base station controller (BSC) (which in turn receives the communication signals from another user equipment (wireless or fixed) in the network downstream of the BSC) via the corresponding path shown in bus 499, processes the signals according to the corresponding technology and protocols to perform modulation, channel coding and other operations, and forwards the processed signals to transmit RF block 412. Transmit RF block 412 may perform operations such as up-conversion to RF (Radio Frequency), and forwards the RF signals to power amplifier 413. Power amplifier 413 amplifies the received RF signals and transmits the power-amplified signals via duplexer 420A, combiner 430 and antenna 440 to corresponding wireless user equipment.

LNA 416 receives an RF signal from a wireless user equipment via duplexer 420A, combiner 430 and antenna 440, amplifies the RF signal, and forwards the amplified RF signal to receive RF block 415. Receive RF block 415 down-converts the RF signal to baseband frequency and forwards the baseband signal to receive baseband block 414. Receive baseband block 414 may perform operations such as demodulation, error correction, etc., on the baseband signals to obtain the information signal (e.g., data, voice) and forwards the information signal to BSC via the corresponding path in bus 499.

Clocks 417 generates one or more clocks required to enable operation of digital units in transceiver 410. For example, transmit baseband block 411 and receive baseband block 414 may internally contain one or more processors that require clocks to enable their operation.

The transmitters, receivers and clocks of the other transceivers of FIG. 4 operate similarly as noted above with respect to transceiver 410A, and contain corresponding transmitter and receiver blocks.

Each of duplexers 420A through 420N enables transmission and reception of the respective transmitted and received signal (i.e., bi-directional (duplex) communication) over the single path between the corresponding duplexer and combiner 430. Each of duplexers 420A through 420N may be implemented with two band-pass filters connected in parallel, with one filter providing a path between the corresponding transmitter and combiner 430, and the other filter providing a path between combiner 430 and the corresponding receiver.

Combiner 430 combines the signals from/to the transceivers 410A through 410N to enable transmission and reception of all the signals using a single antenna 440.

Antenna 440 operates to receive from, and transmit to, a wireless medium, information-bearing wireless signals between the transceivers and wireless user equipment.

Battery bank 450 houses batteries to provide a power source for the operation of the blocks/units in BTS system 400.

Power supply 460 receives power (for example with voltage 12 volts (V)) from battery bank 450 on a power terminal of power supply 460, and contains multiple DC-DC converters 461A through 461M, as well as multiple linear voltage regulators (implemented for example as LDOs) 462A through 462L. DC-DC converters 461A-461M generate various voltages (with each DC-DC converter generating a corresponding voltage such as for example 0.7V, 1.2V, 2.0V, 3.6V, etc.) for powering one or more blocks/components of BTS system 400 described above. Specifically, the voltages generated by the DC-DC converters may be used to power blocks and components in transceivers 410A through 410N that are less sensitive to noise, such as for example the transmit and receive baseband blocks. Thus, supply voltage 491C is shown as being generated by DC-DC converter 461A, and being provided to (the transmit and receive baseband blocks) of transceiver 410. In the interest of clarity and conciseness, only one supply connection directly from a DC-DC converter is shown in FIG. 4. However, there would be many more such supply connections.

Each of LDOs 462A-462L is connected to receive the output voltage of a corresponding DC-DC converter 461A-461M), and generates a corresponding lower voltage as needed for some components/blocks of the transceivers. The voltages generated by the LDOs are used to power noise-sensitive blocks and components in transceivers 410A through 410N, such as for example transmit RF blocks (such as 412), receive RF blocks (such as 415), LNAs (such as 416) and the clocks (such as 417) contained in the transceivers. In the interest of clarity and conciseness, only two supply connections 491A and 491B (from LDO 462A and LDO 462L respectively) are shown in FIG. 4. However, there would be many more such supply connections from the LDOs to corresponding blocks in the transceivers. The LDOs may have better load and line regulation as compared to the DC-DC converters, and may thus provide cleaner supply voltages with lesser noise, as required by the noise-sensitive blocks noted above.

One or more of LDOs 462A-462-L is/are implemented as linear voltage regulator 200 described in detail above.

It is noted here that linear voltage regulator 200 can also be used in other systems, such as, for example, individual transmitters and receivers, mobile phones, etc.

5. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2 and 4 although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A linear voltage regulator comprising:
   a pass transistor with a first current terminal coupled to receive an input voltage, wherein a second current terminal of said pass transistor is coupled to an output node of said linear voltage regulator and provides a regulated output voltage;
   an error amplifier coupled to receive a reference voltage on a first input terminal and a feedback voltage derived from said regulated output voltage on a second input terminal, said error amplifier designed to generate an error signal representing a difference between said reference voltage and said feedback voltage;
   a first driver stage coupled between said error amplifier and said pass transistor, a first transistor of said first driver stage having a control terminal coupled to receive said error signal, wherein a control terminal of said pass transistor is coupled to receive an output of said first driver stage;
   a compensation circuit for frequency compensation of said linear voltage regulator;
   a compensation adjustment circuit to sense a magnitude of current through said first transistor of said first driver stage, and to adjust a parameter of said compensation circuit based on said magnitude of current; and
   a load capacitor coupled between said output node of said linear voltage regulator and a first constant reference potential,
   wherein said compensation adjustment circuit comprises a second transistor, wherein a control terminal of said second transistor is coupled to a control terminal of said first transistor such that said second transistor and said first transistor are in a current-mirror configuration.

2. The linear voltage regulator of claim 1, wherein a combination of said load capacitance and a transconductance of said pass transistor generates a pole in an open-loop transfer function of said linear voltage regulator, wherein a frequency location of said pole varies with the magnitude of a load current drawn from said output node of said linear voltage regulator,
   wherein said compensation circuitry is designed to generate a compensating zero in said open-loop transfer function,
   wherein said compensation adjustment circuit is designed to cause said compensating zero to track said frequency location of said pole by adjusting said parameter.

3. The linear voltage regulator of claim 2, wherein said first driver stage further comprises:
   a first current source coupled between a second constant reference potential and a first current terminal of said first transistor; and
   a first resistor coupled between a second current terminal of said first transistor and a second constant reference potential.

4. The linear voltage regulator of claim 3, wherein said compensation adjustment circuit further comprises:
   a second current source coupled between said second constant reference potential and a first current terminal of said second transistor;

a second resistor coupled between a second current terminal of said second transistor and said second constant reference potential; and a pull-down network coupled between said first current terminal of said second transistor and said second constant reference potential, wherein the voltage across said pull-down network is used to adjust said parameter of said compensation circuit.

5. The linear voltage regulator of claim 4, wherein said pull-down network comprises a third diode-connected transistor, a fourth diode-connected transistor and a third resistor coupled in series.

6. The linear voltage regulator of claim 5, wherein said compensation circuit is an RC (resistance-capacitance) circuit, with the resistance being in series with said capacitance, wherein said parameter of said compensation circuit is a resistance of said RC circuit.

7. The linear voltage regulator of claim 6, wherein said RC circuit comprises:

a fourth resistor, a fifth resistor and a second capacitor coupled in series; and a fifth transistor coupled in parallel with said fourth resistor, wherein a first current terminal of said fifth transistor is coupled to a first terminal of said fourth resistor, and a second current terminal of said fifth transistor is coupled to a second terminal of said fourth resistor, and wherein said first current terminal of said second transistor is coupled to a control terminal of said fifth transistor.

8. The linear voltage regulator of claim 3, further comprising:

a sixth diode-connected transistor having a first current terminal coupled to said first current terminal of said first transistor, and having a second current terminal coupled to said output node of said voltage regulator; and a buffer configured with unity voltage-gain, wherein an input terminal of said buffer is coupled to said first current terminal of said first transistor, wherein an output of said buffer is coupled to a control terminal of said pass transistor.

9. The linear voltage regulator of claim 8, wherein said pass transistor is an N-channel metal oxide semiconductor field effect transistor (NMOSFET), and wherein said linear voltage regulator is a low-drop-out (LDO) regulator.

10. A method of frequency compensation in a linear voltage regulator which generates a regulated voltage at an output node from an input voltage received at an input node, said voltage regulator further comprising a load capacitor coupled between said output node of said linear voltage regulator and a first constant reference potential, said method comprising:

sensing a current flowing through a first transistor of a first driver stage coupled between an error amplifier and a pass transistor of said linear voltage regulator, wherein said first transistor is driven by an output of said error amplifier;

adjusting a parameter of a compensation circuit of said linear voltage regulator based on a magnitude of said current, wherein said adjusting is performed by a compensation adjustment circuit comprising a second transistor, wherein a control terminal of said second transistor is coupled to a control terminal of said first transistor such that said second transistor and said first transistor are in a current-mirror configuration.

11. The method of claim 10, wherein said compensation circuit is designed to introduce a zero in an open-loop transfer function of said linear voltage regulator, wherein said adjusting adjusts a frequency location of said zero.

12. The method of claim 11, wherein said linear voltage regulator comprises a load capacitor, wherein a combination of capacitance of said load capacitor and a transconductance of said pass transistor generates a pole in an open-loop transfer function of said linear voltage regulator, wherein a frequency location of said pole varies with a magnitude of a load current drawn from an output node of said linear voltage regulator, wherein said adjusting adjusts said parameter to cause said zero to track said pole.

13. The method of claim 12, wherein said parameter is a resistance of a resistance-capacitance (RC) circuit.

14. A system comprising:

a power terminal coupled to a power source; and a power supply unit coupled to receive power from said power terminal, said power supply unit comprising a first linear voltage regulator coupled to receive said power and to generate a first lower supply voltage, wherein said first linear voltage regulator comprises:

a pass transistor with a first current terminal coupled to receive said power, wherein a second current terminal of said pass transistor is coupled to an output node of said at least one linear voltage regulator and provides a regulated output voltage as said first lower supply voltage;

an error amplifier coupled to receive a reference voltage on a first input terminal and a feedback voltage derived from said regulated output voltage on a second input terminal, said error amplifier designed to generate an error signal representing a difference between said reference voltage and said feedback voltage;

a first driver stage coupled between said error amplifier and said pass transistor, a first transistor of said first driver stage having a control terminal coupled to receive said error signal, wherein a control terminal of said pass transistor is coupled to receive an output of said first driver stage;

a compensation circuit for frequency compensation of said linear voltage regulator; and a compensation adjustment circuit to sense a magnitude of current through said first transistor of said first driver stage, and to adjust a parameter of said compensation circuit based on said magnitude of current, said system further comprising:

an antenna;

a first duplexer coupled to said antenna; and a first transceiver, wherein said first lower supply voltage is used to power a noise-sensitive block in said first transceiver, said first transceiver comprising a transmitter portion and a receiver portion each coupled to said first duplexer, said first transceiver to transmit communication signals to a wireless medium via said first duplexer and said antenna, said first transceiver to also receive communication signals from said wireless medium via said first duplexer and said antenna.

15. The system of claim 14, wherein said system is a base transceiver station (BTS) system, said BTS system further comprising:

a combiner coupled to said antenna;

a plurality of duplexers, each coupled to said combiner, said plurality of duplexers including said first duplexer; and a plurality of transceivers including said first transceiver, each of said plurality of transceivers comprising a transmitter portion and a receiver portion coupled to a corresponding one of said plurality of duplexers at one end and a base station controller (BSC) at the other end, wherein each of said plurality of transceivers is designed to transmit into said wireless medium information signals received from said BSC via the corresponding one of said plurality of duplexers, said combiner and said antenna, as well as to forward information signals received from said wireless medium via the corresponding one of said plurality of duplexers, said combiner and said antenna to said BSC;

wherein said power supply unit comprises:
a plurality of DC-DC converters coupled to receive said power from said power terminal and to generate respective supply voltages, said plurality of DC-DC converters including a first DC-DC converter to generate a first supply voltage, wherein said first supply voltage is used to power a relatively noise-insensitive block in said first transceiver, wherein said first linear voltage regulator is coupled to receive said first supply voltage converter to generate said first lower supply voltage; and
a plurality of linear voltage regulators coupled to receive a supply voltage from a corresponding one of said DC-DC converters and to generate a corresponding lower supply voltage, wherein said plurality of linear voltage regulators includes said first linear voltage regulator,
wherein supply voltages generated by one or more of said DC-DC converters is used to power relatively noise-insensitive blocks in said plurality of transceivers, and wherein supply voltages generated by one or more of said linear voltage regulators is used to power noise-sensitive blocks in said plurality of transceivers, and
wherein at least a second linear regulator in said plurality of linear voltage regulators is implemented similar to said first linear voltage regulator.

16. The system of claim 15, wherein said first linear voltage regulator further comprises a load capacitor coupled between said output node of said linear voltage regulator and a first constant reference potential,
wherein said compensation adjustment circuit comprises a second transistor, wherein a control terminal of said second transistor is coupled to a control terminal of said first transistor such that said second transistor and said first transistor are in a current-mirror configuration.

17. The system of claim 16, wherein a combination of said load capacitance and a transconductance of said pass transistor generates a pole in an open-loop transfer function of said linear voltage regulator, wherein a frequency location of said pole varies with the magnitude of a load current drawn from said output node of said linear voltage regulator,
wherein said compensation circuitry is designed to generate a compensating zero in said open-loop transfer function,
wherein said compensation adjustment circuit is designed to cause said compensating zero to track said frequency location of said pole by adjusting said parameter.

18. The system of claim 17, wherein said compensation adjustment circuit further comprises:
a second current source coupled between said second constant reference potential and a first current terminal of said second transistor;
a second resistor coupled between a second current terminal of said second transistor and said second constant reference potential; and
a pull-down network coupled between said first current terminal of said second transistor and said second constant reference potential,
wherein the voltage across said pull-down network is used to adjust said parameter of said compensation circuit,
wherein said pull-down network comprises a third diode-connected transistor, a fourth diode-connected transistor and a third resistor coupled in series,
wherein said compensation circuit is an RC (resistance-capacitance) circuit, with the resistance being in series with said capacitance, wherein said parameter of said compensation circuit is a resistance of said RC circuit,
wherein said linear voltage regulator further comprises:
a fifth diode-connected transistor having a first current terminal coupled to said first current terminal of said first transistor, and having a second current terminal coupled to said output node of said voltage regulator; and
a buffer configured with unity voltage-gain, wherein an input terminal of said buffer is coupled to said first current terminal of said first transistor, wherein an output of said buffer is coupled to a control terminal of said pass transistor.

19. A system comprising:
a power terminal coupled to a power source; and
a power supply unit coupled to receive power from said power terminal, said power supply unit comprising a first linear voltage regulator coupled to receive said power and to generate a first lower supply voltage,
wherein said first linear voltage regulator comprises:
a pass transistor with a first current terminal coupled to receive said power, wherein a second current terminal of said pass transistor is coupled to an output node of said at least one linear voltage regulator and provides a regulated output voltage as said first lower supply voltage;
an error amplifier coupled to receive a reference voltage on a first input terminal and a feedback voltage derived from said regulated output voltage on a second input terminal, said error amplifier designed to generate an error signal representing a difference between said reference voltage and said feedback voltage;
a first driver stage coupled between said error amplifier and said pass transistor, a first transistor of said first driver stage having a control terminal coupled to receive said error signal, wherein a control terminal of said pass transistor is coupled to receive an output of said first driver stage;
a compensation circuit for frequency compensation of said linear voltage regulator;
a compensation adjustment circuit to sense a magnitude of current through said first transistor of said first driver stage, and to adjust a parameter of said compensation circuit based on said magnitude of current; and
a load capacitor coupled between said output node of said linear voltage regulator and a first constant reference potential,
wherein said compensation adjustment circuit comprises a second transistor, wherein a control terminal of said second transistor is coupled to a control terminal of said first transistor such that said second transistor and said first transistor are in a current-mirror configuration.

\* \* \* \* \*